No. 623,478. Patented Apr. 18, 1899.
F. C. KEENE.
AIR INLET VALVE FOR SEWERS.
(Application filed Dec. 19, 1898.)
(No Model.) 2 Sheets—Sheet 2.

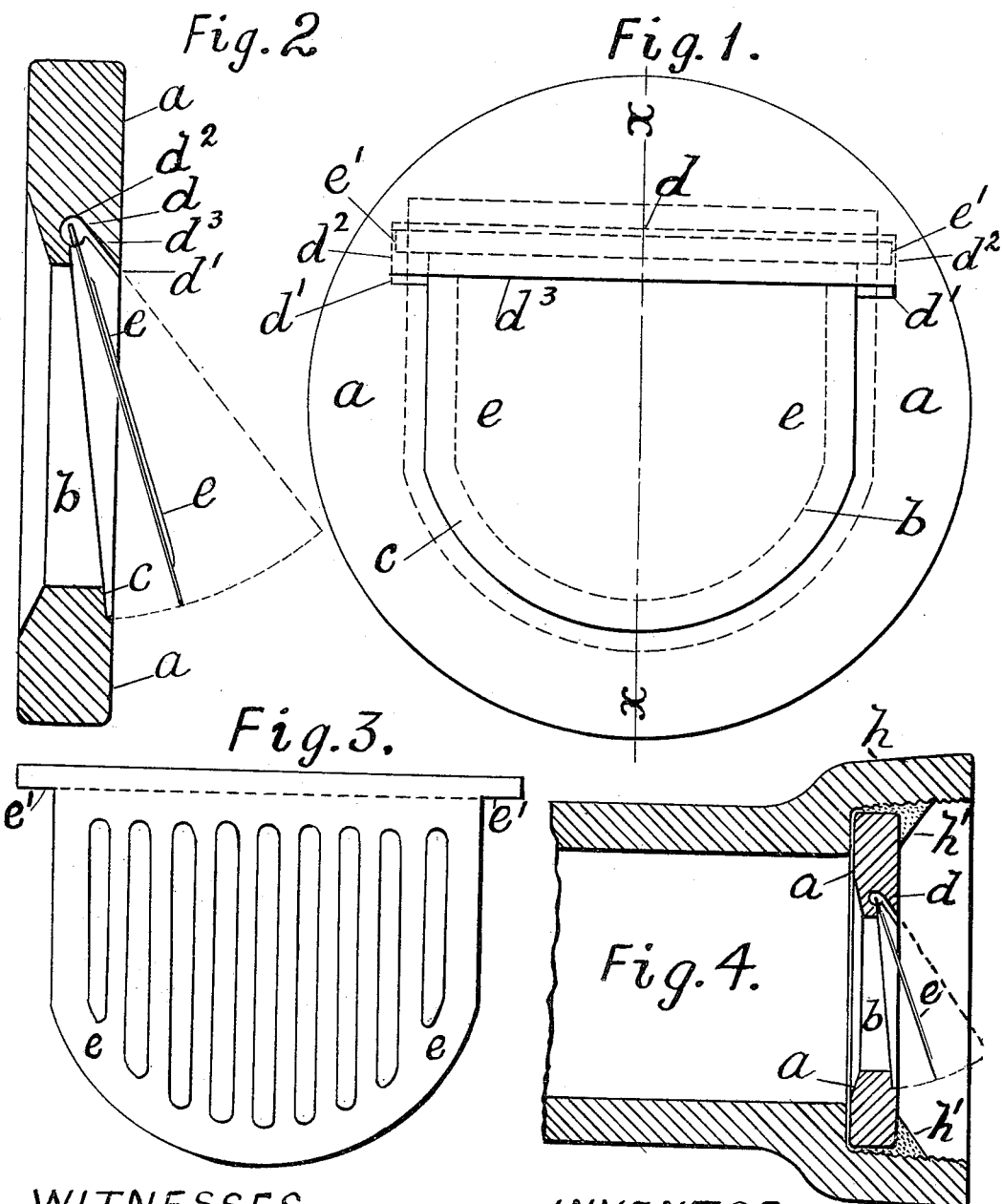

WITNESSES. INVENTOR.
Frederick C. Keene
By James L. Norris

THE NORRIS PETERS CO., PHOTO-LITHO., WASHINGTON, D. C.

UNITED STATES PATENT OFFICE.

FREDERICK CHARLES KEENE, OF BOURNEMOUTH, ENGLAND.

AIR-INLET VALVE FOR SEWERS.

SPECIFICATION forming part of Letters Patent No. 623,478, dated April 18, 1899.

Application filed December 19, 1898. Serial No. 699,745. (No model.)

*To all whom it may concern:*

Be it known that I, FREDERICK CHARLES KEENE, building inspector, a subject of the Queen of Great Britain, residing at Ardenville, Wimborne road, Winton, Bournemouth, in the county of Hampshire, England, have invented certain new and useful Improvements in Air-Inlet Valves for Sewers, House-Drains, and the Like, of which the following is a specification.

My invention relates to improvements in that type of valve used for admitting air to sewers, house-drains, and for analogous purposes and which are particularly applicable to cases or conditions in which light rigid valves are required, so sensitive that they open with the slightest appreciable in-current or draw in a drain conduit or pipe and immediately close against back or reverse currents or drafts and effectually prevent the escape of any such back or reverse currents, sewer-gases, or smells through the conduit or pipe from the sewer or drain. The valve and its seat according to my invention are self-contained and applicable to be fitted to the conduit or pipe without any separate casing or valve-box. I attain these objects by my improved air-inlet valve and seat, which, with examples of the modes of application and position thereof, are illustrated in the accompanying drawings in the form at present preferred by me, and I will now describe the same, reference being had to the said drawings and to the letters of reference marked thereon, the same or corresponding parts being indicated by like letters throughout the several figures of the drawings.

Figure 5:
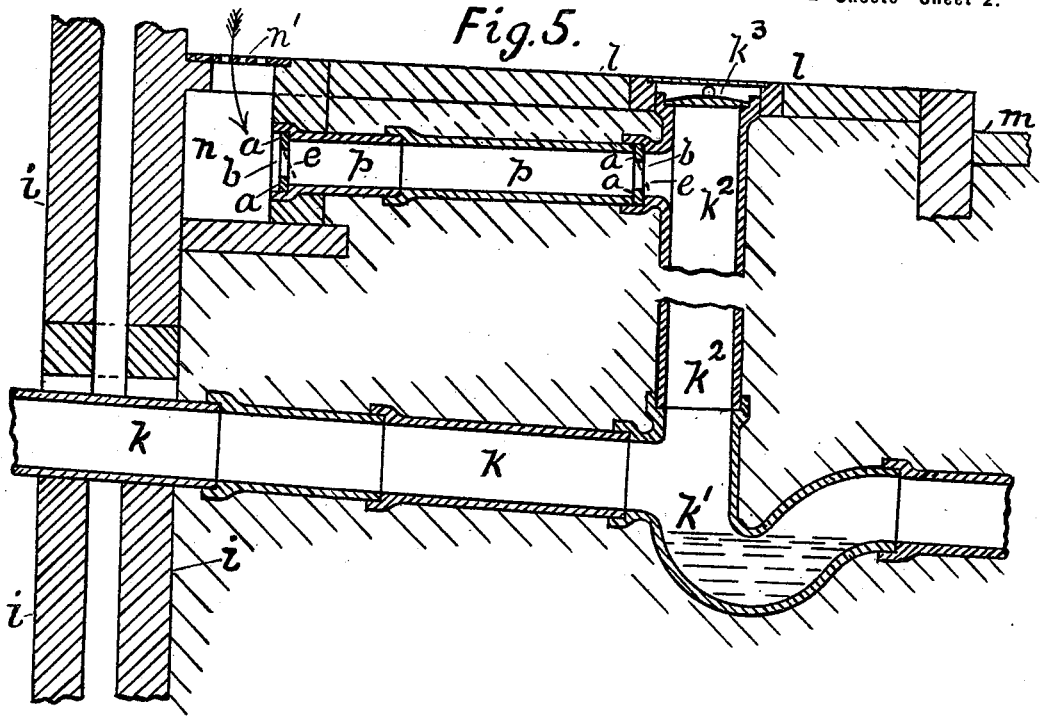
Figures 6, 7:
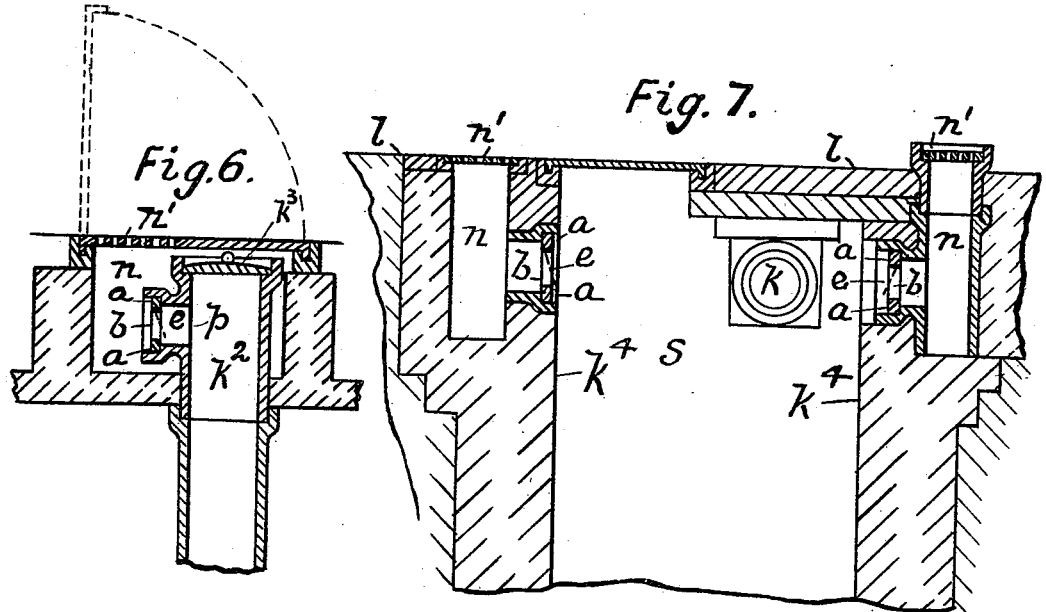

Figure 1 illustrates a front view of the valve-seat and valve. Fig. 2 shows a section of the valve-seat and valve, taken through the line $x\ x$, Fig. 1. Fig. 3 shows the valve removed from its seat. Fig. 4 shows the location of the valve-seat and valve in the socket of a pipe. Fig. 5 shows examples of the valve-seat and valve in two positions, either of which may be used, applied to admit air to a house-drain. Fig. 6 shows another example of the application of the valve-seat and valve applied to admit air to a house-drain. Fig. 7 shows two examples of the application of the valve-seat and valve built into the brickwork of a sewer manhole or chamber.

Under my invention the valve-seat consists of a disk or ring preferably made of molded glazed stoneware and of a size to fit into and be held by the socket of an ordinary earthenware pipe, such as a drain-pipe, in which it can be set by a cement or what is known as a "Stanford" joint. The disk or ring has a center opening or way and a groove in which the valve flap or leaf is supported.

The valve consists of a flap, leaf, or tympanum, preferably of aluminium, and corrugated and provided with projections or arms by which it can be hung or supported in the groove on the earthenware disk and be free to vibrate on the valve-seat. The valve-seat and valve are made of size adapted to fit and be set in the socket of an ordinary earthenware pipe by any ordinary workman and are in a position where they are not likely to be tampered with.

Although I prefer that the valve-seat should be of glazed stoneware and the valve of aluminium and corrugated, I would have it understood that the valve-seat may be of metal or other suitable material, and the valve may be of other metal, mica, or other light material, and that the valve-seat and valve may be of round, square, or other suitable shape, and the valve-seat and valve may be adapted to be applied to any suitable conduit.

With reference to the drawings, and more particularly to Figs. 1, 2, 3, and 4, $a$ designates the glazed stoneware disk, and $b$ denotes the opening or way. $c$ is the face of the valve-seat, against which the valve rests when closed. This face $c$ is preferably made with an incline. $d$ is the groove in which the upper part of the valve fits, and $d'$ are slits through which the supporting-arms of the valve are inserted to rest in the parts $d^2$ of the groove. The front of the groove is flared or widened, as shown in Fig. 2, at $d^3$ to provide for and limit the opening or travel of the valve. $e$ denotes the flap, leaf, or tympanum forming the valve, and $e'$ are the projections or arms by which the valve $e$ is supported in the parts $d^2$ of the valve-seat $a$ free to vibrate from and to the valve-seat face $c$. $h$ designates the end socket of an earthenware pipe, into which the valve-seat $c$ is adapted to fit and in which it may be set by a cement or other joint $h'$.

In the application of the valve-seat $a$ and valve it may be placed where and as desired. For example, it may be placed as shown in Fig. 5, in which $i$ designates the wall of a house, $k$ the house-drain with a trap $k'$ to sewer, $l$ the footwalk, and $m$ the roadway. $k^2$ is a vertical pipe from the drain $k$ to the footwalk $l$, and $k^3$ are covers for inspection. $n$ is an air-inlet chamber having a grating $n'$, and $p$ is an air-inlet pipe from the chamber $n$ to the vertical pipe $k^2$. The air-inlet valves according to my invention are placed at the ends of the pipe $p$, as shown, and open to permit of the inlet of fresh air, but close to prevent the return or escape of sewer-gas.

In Fig. 6 the vertical pipe $k^2$ is set in a chamber, part of which has a grating-cover which provides an air-inlet, and the air-inlet valve is fixed in a branch $p$, as shown.

In Fig. 7, $s$ designates a closed chamber or manhole. $k$ is the tributary drain-pipe. $n$ are conduits built into the brickwork $k^4$ of the chamber and forming air-inlets and in which the air-inlet valves are provided, as shown.

Among other advantages in connection with air-inlet valves according to my invention may be mentioned simplicity in construction and manufacture, inexpensive mode of application, absence of complicated parts, no special pipes or materials being required for fixing, and the valves can be fixed by an ordinary workman.

Having thus described my invention and shown modes of its application, what I claim is—

1. An air-inlet valve for sewers and other drains, consisting of a frame adapted to fit within the socket of a drain-pipe and provided with a valve-seat, and a valve leaf, or flap formed of a sheet of suitable material and having oppositely-projecting arms in the axial line of said valve-leaf to engage with the ends of a groove formed horizontally in the upper part of said frame, said groove being flared, or widened, to permit said valve-leaf to vibrate and to limit its range of vibration, substantially as described.

2. An air-inlet valve for sewers and other drains, consisting of a circular frame adapted to fit within the socket of an earthenware drain-pipe and having an opening surrounded by a valve-seat, the face of which is slightly inclined from a vertical plane, and a valve leaf or flap consisting of a thin sheet of suitable material of a form to enter said valve-seat, and provided with arms projecting in opposite directions in the horizontal axial line of said valve-leaf and beyond the sides of the latter, to engage with the ends of a horizontal groove formed in the frame above its opening and flared, or widened to permit the vibration of said valve-leaf and limit the range thereof, substantially as described.

In testimony whereof I have hereunto set my hand in presence of two subscribing witnesses.

FREDERICK CHARLES KEENE.

Witnesses:
 FREDERICK DOLAMORE,
 IGNATIUS BULFRIE.